US010005450B2

(12) United States Patent
Nawata et al.

(10) Patent No.: US 10,005,450 B2
(45) Date of Patent: Jun. 26, 2018

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventors: Hidekazu Nawata, Gotemba (JP); Toshio Inoue, Gotemba (JP); Keita Fukui, Fujinomiya (JP); Tomoaki Honda, Gotemba (JP); Yuta Niwa, Mishima (JP); Taichi Osawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/126,094

(22) PCT Filed: Mar. 13, 2015

(86) PCT No.: PCT/IB2015/000323
§ 371 (c)(1),
(2) Date: Sep. 14, 2016

(87) PCT Pub. No.: WO2015/140617
PCT Pub. Date: Sep. 24, 2015

(65) Prior Publication Data
US 2017/0096136 A1 Apr. 6, 2017

(30) Foreign Application Priority Data

Mar. 18, 2014 (JP) .................................. 2014-054864

(51) Int. Cl.
*B60W 20/16* (2016.01)
*B60K 6/44* (2007.10)
(Continued)

(52) U.S. Cl.
CPC ............. *B60W 20/16* (2016.01); *B60K 6/445* (2013.01); *B60L 11/1875* (2013.01);
(Continued)

(58) Field of Classification Search
CPC ....... F01N 3/027; B60W 20/13; B60W 10/08; B60W 20/00; B60W 10/06;
(Continued)

(56) References Cited

U.S. PATENT DOCUMENTS 6,421,599 B1    7/2002   Lippa et al.
2008/0276602 A1* 11/2008   McCabe ............... F01N 3/0821
                                                                    60/295
(Continued)

FOREIGN PATENT DOCUMENTS

CN       102251835 A     11/2011
CN       102272389 A     12/2011
(Continued)

*Primary Examiner* — Rodney Allen Butler
(74) *Attorney, Agent, or Firm* — Finnegan, Henderson, Farabow, Garrett & Dunner LLP

(57) ABSTRACT

A hybrid vehicle includes an internal combustion engine, a filter, an electrical storage device, a rotating electric machine, and a controller. The filter is configured to trap particulate matter in exhaust gas of the internal combustion engine. The rotating electric machine is configured to generate electric power using power from the internal combustion engine so as to charge the electrical storage device, and drive the internal combustion engine using electric power from the electrical storage device. The controller is configured to control the internal combustion engine and the rotating electric machine, so as to warm up the electrical storage device when regeneration control needs to be performed and when the temperature of the electrical storage device is lower than a reference value. The regeneration control is control for raising the temperature of the filter to a predetermined temperature so as to burn the particulate (Continued)

matter. The controller may be configured to execute the regeneration control when the temperature of the electrical storage device exceeds the reference value.

11 Claims, 10 Drawing Sheets

(51) Int. Cl.
| | |
|---|---|
| *B60L 11/18* | (2006.01) |
| *B60K 6/445* | (2007.10) |
| *B60W 10/06* | (2006.01) |
| *B60W 10/08* | (2006.01) |
| *B60W 20/00* | (2016.01) |
| *F02D 41/02* | (2006.01) |
| *H01M 10/615* | (2014.01) |
| *H01M 10/44* | (2006.01) |
| *H01M 10/48* | (2006.01) |
| *H01M 10/625* | (2014.01) |
| *H01M 10/63* | (2014.01) |
| *B60W 20/13* | (2016.01) |
| *F01N 3/027* | (2006.01) |
| *B60W 10/26* | (2006.01) |
| *H01M 10/6564* | (2014.01) |
| *F02D 37/02* | (2006.01) |

(52) U.S. Cl.
CPC ............ *B60W 10/06* (2013.01); *B60W 10/08* (2013.01); *B60W 10/26* (2013.01); *B60W 20/00* (2013.01); *B60W 20/13* (2016.01); *F01N 3/027* (2013.01); *F02D 41/029* (2013.01); *F02D 41/0245* (2013.01); *H01M 10/443* (2013.01); *H01M 10/486* (2013.01); *H01M 10/615* (2015.04); *H01M 10/625* (2015.04); *H01M 10/63* (2015.04); *B60L 2240/545* (2013.01); *B60W 2510/068* (2013.01); *B60W 2510/246* (2013.01); *B60W 2530/12* (2013.01); *B60W 2710/0694* (2013.01); *B60W 2710/246* (2013.01); *B60Y 2300/476* (2013.01); *F02D 37/02* (2013.01); *F02D 2041/026* (2013.01); *F02D 2200/503* (2013.01); *H01M 10/6564* (2015.04); *H01M 2220/20* (2013.01); *Y02T 10/26* (2013.01); *Y02T 10/54* (2013.01); *Y02T 10/6239* (2013.01); *Y02T 10/705* (2013.01); *Y02T 10/7005* (2013.01); *Y10S 903/93* (2013.01)

(58) Field of Classification Search
CPC ..... B60W 2510/068; B60W 2510/246; B60W 2710/0694; B60W 2710/246; B60W 2530/12; F02D 41/0245; F02D 41/029; F02D 2200/503; F02D 2041/026; F02D 37/02; H01M 10/63; H01M 10/625; H01M 10/486; H01M 10/443; H01M 10/615; H01M 2220/20; H01M 10/6564; B60K 6/445; Y02T 10/705; Y02T 10/7005; Y02T 10/54; Y02T 10/6239; Y02T 10/26; B60L 2240/545; Y10S 903/93; B60Y 2300/476
See application file for complete search history.

(56) References Cited

U.S. PATENT DOCUMENTS

| | | | |
|---|---|---|---|
| 2011/0072791 A1 | 3/2011 | Bidner et al. | |
| 2011/0072799 A1 | 3/2011 | Bidner et al. | |
| 2011/0257821 A1* | 10/2011 | Beaucaire | B60W 10/06 701/22 |
| 2011/0270481 A1 | 11/2011 | Koga et al. | |
| 2013/0204476 A1* | 8/2013 | Zink | B60W 10/06 701/22 |

FOREIGN PATENT DOCUMENTS

| | | |
|---|---|---|
| EP | 2 374 945 A1 | 10/2011 |
| JP | 2000-40536 | 2/2000 |
| JP | 2005-90259 | 4/2005 |
| JP | 2005-248833 | 9/2005 |
| JP | 2005-344549 | 12/2005 |
| JP | 2007-230409 | 9/2007 |
| JP | 2007-230475 | 9/2007 |
| JP | 2009-154697 | 7/2009 |
| JP | 5356416 B2 | 9/2013 |

* cited by examiner

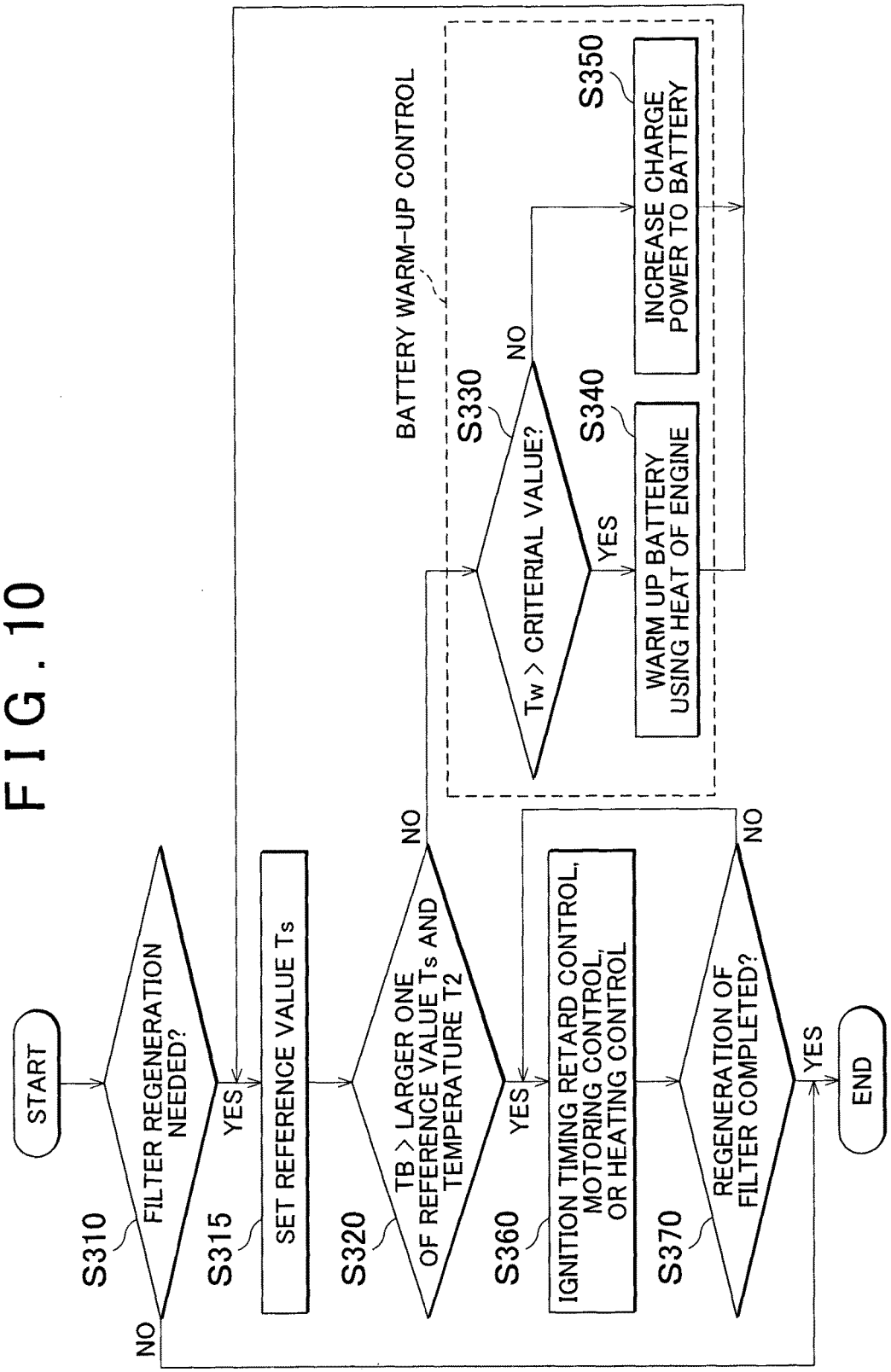

HYBRID VEHICLE AND METHOD OF CONTROLLING THE SAME

CROSS-REFERENCE TO RELATED APPLICATIONS

This application is a national phase application of International Application No. PCT/IB2015/000323, filed Mar. 13, 2015, and claims the priority of Japanese Application No. 2014-054864, filed Mar. 18, 2014, the content of both of which is incorporated herein by reference.

BACKGROUND OF THE INVENTION

1. Field of the Invention

The invention relates to a hybrid vehicle and a method of controlling the hybrid vehicle. In particular, the invention relates to a hybrid vehicle including a filter for trapping particulate matter in exhaust gas of an internal combustion engine, and a method of controlling the hybrid vehicle.

2. Description of Related Art

Exhaust gas emitted from an engine contains particulate matter (which will also be referred to as "PM"). It is preferable not to emit the PM into the atmosphere since the PM may exert an influence on the environment, or the like. Therefore, a filter for trapping the PM may be installed in an exhaust passage of the engine.

When the PM is deposited on the filter, clogging may occur to the filter, and the filter may suffer from erosion or cracks, for example. Accordingly, when the amount of deposition of the PM reaches a given amount, it is necessary to remove the PM so as to recover the filter from clogging. To remove the PM as in this case will be called regeneration of the filter. As specific control for regenerating the filter, it has been proposed to raise the temperature of exhaust gas by increasing the output of the engine, so as to burn the PM.

For example, an engine control device disclosed in Japanese Patent Application Publication No. 2005-90259 (JP 2005-90259 A) is configured to adjust the state of charge (SOC) of a battery so that the battery has some room for charging, when a filter needs to be regenerated in a hybrid vehicle. Thus, when the output of the engine is increased for regeneration of the filter, the battery can be charged with electric power generated by a generator. The electrical power generated by the generator corresponds to an amount of increase of the output of the engine.

SUMMARY OF THE INVENTION

As the battery temperature decreases, the internal resistance of the battery tends to increase. Therefore, when the battery is in a low-temperature condition in winter or in cold regions, for example, joule loss due to the internal resistance increases. Therefore, the charging/discharging efficiency is reduced as compared with the case where the battery temperature is in a relatively high condition. Accordingly, in a battery installed on a hybrid vehicle, charge/discharge electric power (charge power or discharge power) is restricted, so as to reduce an influence of reduction of the charging/discharging efficiency in the case where the battery is in a low-temperature condition.

In the engine control device disclosed in JP 2005-90259 A, When the charge power is restricted when the battery is in a low-temperature condition, the battery may not be charged with electric power corresponding to the amount of increase of the output of the engine as charge power. As a result, regeneration control of the filter may not be sufficiently performed.

The invention has been developed so as to solve the above-described problem. The invention is to provide a hybrid vehicle capable of performing regeneration control on a filter, even when a battery has a low temperature and the charge/discharge power of the battery is restricted, and a method of controlling the hybrid vehicle.

According to one aspect of the invention, a hybrid vehicle includes an internal combustion engine, a filter, an electrical storage device, a rotating electric machine, and a controller. The filter is configured to trap particulate matter in exhaust gas of the internal combustion engine. The rotating electric machine is configured to generate electric power using power from the internal combustion engine so as to charge the electrical storage device, and drive the internal combustion engine using electric power from the electrical storage device. The controller is configured to control the internal combustion engine and the rotating electric machine so as to warm up the electrical storage device, when regeneration control needs to be performed and when a temperature of the electrical storage device is lower than a predetermined reference value. The regeneration control is control for raising a temperature of the filter to a predetermined temperature so as to burn the particulate matter. In the hybrid vehicle according to the above aspect of the invention, the controller may be configured to execute the regeneration control when the temperature of the electrical storage device exceeds the reference value.

As the filter regeneration control, output level elevation control or motoring control is known, for example. The output level elevation control is control for increasing the output of the internal combustion engine to a level higher than that required for moving the vehicle. When the output of the internal combustion engine is increased, the temperature of exhaust gas rises so that the temperature of the filter can be raised, and the particulate matter can be burned. At this time, the increased amount of the output cannot be used for moving the vehicle, but used for driving the rotating electric machine so as to generate electric power, and the electrical storage device is charged with the electric power thus generated. The motoring control is control for causing the rotating electric machine to drive the internal combustion engine in a condition where no combustion takes place in the engine. When the motoring control is performed, the amount of oxygen drawn into the engine is increased, resulting in an improved combustion state in the filter. As a result, the PM can be burned. In this case, the electric power for driving the rotating electric machine is discharged from the electrical storage device. Thus, the electrical storage device is charged or discharged along with the filter regeneration control.

However, when the temperature of the electrical storage device is lower than a reference value (for example, a temperature at or below which the charge/discharge power from the electrical storage device is strictly restricted), the charge/discharge power is restricted. As a result, the filter regeneration control may not be sufficiently performed. With the above arrangement, when the temperature of the electrical storage device is lower than the above-indicated reference value, the electrical storage device is warmed up. Therefore, the temperature of the electrical storage device can be raised until it becomes higher than the reference value. Thus, restrictions on the charge/discharge power are reduced, and therefore, the filter regeneration control can be surely carried out.

In the hybrid vehicle according to the above aspect of the invention, the controller may be configured to warm up the electrical storage device using air warmed by the internal combustion engine, when a temperature of the internal combustion engine is higher than a predetermined criterial value, and warm up the electrical storage device by charging or discharging the electrical storage device, when the temperature of the internal combustion engine is lower than the criterial value.

With the above arrangement, when the temperature of the internal combustion engine is higher than the criterial value, the electrical storage device can be warmed up using air warmed by heat of the internal combustion engine. On the other hand, when the temperature of the internal combustion engine is lower than the criterial value, the electrical storage device can be warmed up, using heat generated by the electrical storage device during charge or discharge thereof.

In the hybrid vehicle according to the above aspect of the invention, an upper limit value of discharge power discharged from the electrical storage device when the temperature of the electrical storage device is lower than a first threshold value may be set to be smaller than an upper limit value of discharge power discharged from the electrical storage device when the temperature of the electrical storage device is higher than the first threshold value. Also, the controller may be configured to warm up the electrical storage device until the temperature of the electrical storage device becomes higher than the first threshold value, when the temperature of the electrical storage device is lower than the first threshold value. Further, the first threshold value may be set to a first predetermined temperature. The first predetermined temperature is a temperature at which electric power needed for motoring control performed on the internal combustion engine can be supplied from the electrical storage device, when the regeneration control is performed by increasing oxygen in the exhaust gas through the motoring control. The motoring control is control for causing the rotating electric machine to drive the internal combustion engine in a condition where no combustion takes place in the internal combustion engine.

With the above arrangement, the threshold value is set to the temperature at which the electrical storage device becomes able to supply electric power used by the rotating electric machine for driving the internal combustion engine (for example, electric power needed for motoring control). When the temperature of the electrical storage device is lower than the threshold value, the electrical storage device is warmed up until the temperature of the electrical storage device exceeds the threshold value; therefore, restrictions on the discharge power are reduced, and the motoring control can be performed using the rotating electric machine. As a result, the filter regeneration control can be carried out.

In the hybrid vehicle according to the above aspect of the invention, an upper limit value of charge power with which the electrical storage device is charged when the temperature of the electrical storage device is lower than a second threshold value may be set to be smaller than an upper limit value of charge power with which the electrical storage device is charged when the temperature of the electrical storage device is higher than the second threshold value. Also, the controller may be configured to warm up the electrical storage device until the temperature of the electrical storage device becomes higher than the second threshold value, when the temperature of the electrical storage device is lower than the second threshold value. Further, the second threshold value may be set to a second predetermined temperature. The second predetermined temperature may be a temperature at which the electrical storage device can be charged with electric power generated by the rotating electric machine when the regeneration control is performed by raising a temperature of the exhaust gas by increasing the output of the internal combustion engine. The electric power generated by the rotating electric machine corresponds to an amount of increase of an output of the internal combustion engine.

With the above arrangement, when the internal combustion engine is controlled (output level elevation control) so as to increase the output of the engine to a level higher than that required for moving the vehicle, for example, the threshold value is set to the temperature at which the electrical storage device can be charged with electric power corresponding to the amount of increase of the output. When the temperature of the electrical storage device is lower than the threshold value, the electrical storage device is warmed up until the temperature of the electrical storage device exceeds the threshold value; therefore, restrictions on the charge power are reduced, and the electrical storage device can be charged with electric power generated by the rotating electric machine. As a result, the filter regeneration control can be carried out.

In the hybrid vehicle as described above, the reference value may be set to be larger than the first threshold value. The controller may be configured to warm up the electrical storage device until the temperature of the electrical storage device becomes higher than the reference value, when the temperature of the electrical storage device is lower than the reference value. Also, the reference value may be set to be larger than the second threshold value. The controller may be configured to warm up the electrical storage device until the temperature of the electrical storage device becomes higher than the reference value, when the temperature of the electrical storage device is lower than the reference value.

With the above arrangement, the electrical storage device is warmed up to a temperature level that is higher than the threshold value, so that a margin for the threshold value can be secured. Therefore, even if warm-up of the electrical storage device is finished, the charge power or discharge power from the electrical storage device is less likely to be restricted until the temperature of the electrical storage device is reduced down to the threshold value.

In the hybrid vehicle as described above, the controller may be configured to execute the regeneration control when the temperature of the electrical storage device exceeds a larger one of the reference value and the first threshold value. Also, the controller may be configured to execute the regeneration control when the temperature of the electrical storage device exceeds a larger one of the reference value and the second threshold value.

With the above arrangement, the electrical storage device is warmed up to the larger one of the reference value and the threshold value; therefore, the filter regeneration control can be performed with ease or reliability until the temperature of the electrical storage device is reduced to the smaller one of the reference value and the threshold value.

According to another aspect of the invention, a method of controlling a hybrid vehicle including an internal combustion engine, a filter, an electrical storage device, a rotating electric machine, and a controller is provided. The filter is configured to trap particulate matter in exhaust gas of the internal combustion engine. The rotating electric machine is configured to generate electric power using power from the internal combustion engine so as to charge the electrical storage device, and drive the internal combustion engine using electric power from the electrical storage device. The method includes warming up the electrical storage device, by the controller, when regeneration control needs to be performed and when a temperature of the electrical storage device is lower than a predetermined reference value. The method further includes executing the regeneration control, by the controller, after the electrical storage device is warmed up.

According to the invention, in the hybrid vehicle, the filter regeneration control can be carried out even when the battery temperature is low and the charge/discharge power of the battery is restricted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a flowchart illustrating a control routine executed when control under which electric power is discharged from the battery is performed as GPF regeneration control in the third embodiment.

DETAILED DESCRIPTION OF EMBODIMENTS

Figure 1:
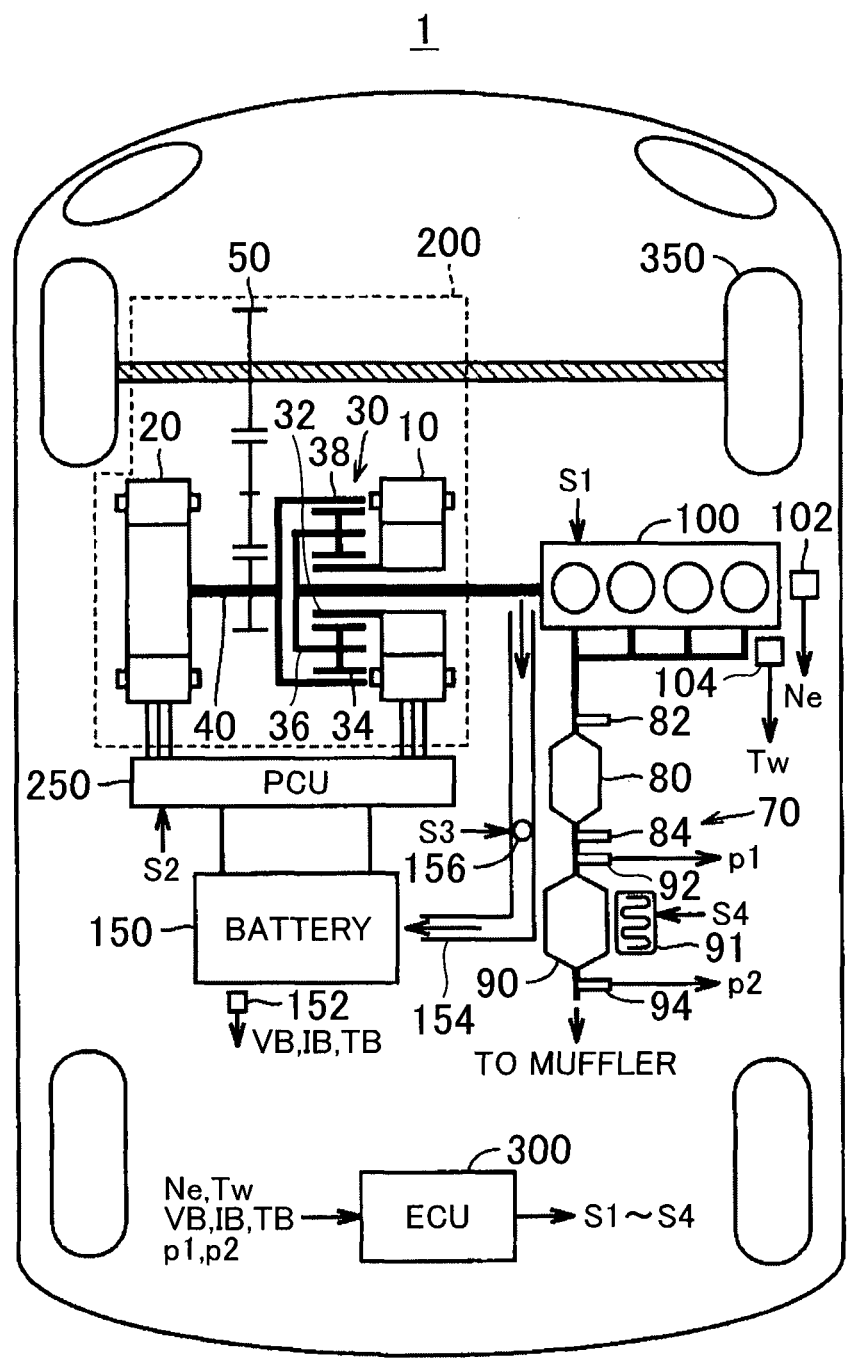
FIG. 1 is a block diagram schematically showing the configuration of a vehicle according to a first embodiment of the invention.

Some embodiments of the invention will be described in detail with reference to the drawings. In the drawings, the same reference numerals are assigned to the same or corresponding portions or elements, of which explanation will not be repeated.

FIG. 1 is a block diagram schematically showing the configuration of a vehicle according to a first embodiment of the invention. Referring to FIG. 1, the vehicle 1 is a hybrid vehicle. The vehicle 1 includes an engine 100, a battery 150, a transmission 200, a PCU (Power Control Unit) 250, an ECU (Electronic Control Unit) 300, and drive wheels 350.

The engine 100 (internal combustion engine) generates driving force for moving the vehicle 1, according to a control signal 51 from the ECU 300. In this embodiment, a gasoline engine is employed as the engine 100. However, the fuel of the engine 100 is not limited to gasoline, but may be light oil (diesel fuel), biofuel (such as ethanol), or gas fuel (such as propane gas), for example.

A crank position sensor 102 is provided at a position opposed to a crankshaft (not shown) of the engine 100. The crank position sensor 102 detects the rotational speed Ne of the engine 100 (which will also be called "engine speed"), and outputs the detection result to the ECU 300.

Also, a water temperature sensor 104 is provided in a circulation pathway (not shown) of coolant of the engine 100. The water temperature sensor 104 detects the temperature Tw of the coolant of the engine 100 (which will also be called "engine temperature"), and outputs the detection result to the ECU 300.

The transmission 200 includes a first MG (Motor-Generator) 10, a second MG 20, a power split device 30, a drive shaft 40, and a speed reducer 50.

Each of the first MG 10 and the second MG 20 is a three-phase AC rotating electric machine in which permanent magnets (not shown) are embedded in a rotor (not shown), for example. The first MG 10 and the second MG 20 are both driven by the PCU 250.

The first MG 10 is coupled to the crankshaft of the engine 100 via the power split device 30. The first MG 10 rotates the crankshaft of the engine 100, using electric power of the battery 150. The first MG 10 is also able to generate electric power (AC power), using the power from the engine 100. The AC power generated by the first MG 10 is converted by the PCU 250 into DC power, and the battery 150 is charged with the DC power. The AC power generated by the first MG 10 may also be supplied to the second MG 20.

The second MG 20 rotates the drive shaft 40, using at least one of electric power from the battery 150 and electric power generated by the first MG 10. The second MG 20 is also able to generate electric power through regenerative braking. The AC power generated by the second MG 20 is converted by the PCU 250 into DC power, and the battery 150 is charged with the DC power.

The power split device 30 is a power transmission device that mechanically couples three elements, i.e., the crankshaft of the engine 100, a rotary shaft (not shown) of the first MG 10, and the drive shaft 40. The power split device 30 causes a selected one of the above-indicated three elements to function as a reaction force element, thereby to permit power to be transmitted between the remaining two elements.

The power split device 30 is a planetary gear mechanism including a sun gear 32, pinion gears 34, a carrier 36, and a ring gear 38, for example. The sun gear 32 is coupled to the rotary shaft of the first MG 10. The pinion gears 34 mesh with each of the sun gear 32 and the ring gear 38. The carrier 36 supports the pinion gears 34 such that the pinion gears 34 can rotate about themselves, and is coupled to the crankshaft of the engine 100. The ring gear 38 is coupled to a rotary shaft (not shown) of the second MG 20 and the speed reducer 50 via the drive shaft 40.

The drive shaft 40 is coupled to the drive wheels 350 via the speed reducer 50. The speed reducer 50 transmits power from the power split device 30 or the second MG 20 to the drive wheels 350. Also, reaction force which the drive wheels 350 receive from the road surface is transmitted to the second MG 20 via the speed reducer 50 and the power split device 30. Thus, the second MG 20 generates electric power during regenerative braking.

The PCU 250 converts DC power stored in the battery 150 into AC power, and supplies the AC power to the first MG 10 and the second MG 20. Also, the PCU 250 converts AC power generated by the first MG 10 and the second MG 20 into DC power, and supplies the DC power to the battery 150. The PCU 250 is controlled according to a control signal S2 from the ECU 300.

The battery 150 (electrical storage device) is a rechargeable DC power supply. As the battery 150, a secondary battery, such as a nickel-metal-hydride battery or a lithium-ion battery, or a capacitor, such as an electric double layer capacitor, may be employed.

The battery 150 is provided with a battery sensor 152. The battery sensor 152 comprehensively denotes a current sensor, voltage sensor, and a temperature sensor (all of which are not shown). The voltage sensor detects the voltage VB of the battery 150. The current sensor detects the current IB that flows into and out of the battery 150. The temperature sensor detects the temperature TB of the battery 150 (which will also be called "battery temperature"). Each of these sensors outputs a signal indicative of the detection result to the ECU 300. The ECU 300 estimates the SOC of the battery 150, based on the voltage VB, current IB and battery temperature TB of the battery 150.

A duct 154 that permits air (hot air) warmed with heat of the engine 100 to flow through the battery 150 is provided between the battery 150 and the engine 100. The duct 154 may be formed so as to diverge from a pathway (not shown) of hot air for warming up the vehicle interior, for example. A fan 156 is provided in the duct 154. When the fan 156 is driven according to a control signal S3 from the ECU 300, hot air is led to the battery 150. In this manner, the battery 150 can be warmed up. It is to be noted that the hot air is not limited to air warmed by use of heat of exhaust gas, provided that the air is warmed with heat of the engine.

A catalyst device 80 is provided in an exhaust passage 70 of the engine 100. The catalyst device 80 oxidizes an unburned component or components (such as hydrocarbon (HC) and carbon monoxide (CO)) contained in exhaust gas emitted from the engine 100, and reduces an oxidizing component or components (such as nitrogen oxides (NOx)) contained in the exhaust gas.

An air-fuel ratio sensor 82 is provided at a position upstream of the catalyst device 80 in the exhaust passage 70. The air-fuel ratio sensor 82 detects the air-fuel ratio of an air-fuel mixture of fuel and air in exhaust gas. Also, an oxygen sensor 84 is provided at a position downstream of the catalyst device 80 in the exhaust passage 70. The oxygen sensor 84 detects the concentration of oxygen in the exhaust gas. Each of the sensors outputs the detection result to the ECU 300. The ECU 300 calculates the air-fuel ratio based on the detection results from the respective sensors.

A filter 90 is provided at a position downstream of the oxygen sensor 84, in the exhaust passage 70. Since the engine 100 is a gasoline engine in this embodiment, a GPF (Gasoline Particulate Filter) is employed as the filter 90. The filter 90 traps particulate matter (PM) discharged from the engine 100. The trapped PM is deposited on the filter 90. When the PM is deposited on the filter 90, clogging may occur to the filter 90, and the filter 90 may suffer from erosion or cracks, for example. Accordingly, when the amount of deposition of the PM reaches a given amount, the PM needs to be removed.

A pressure sensor 92 is provided at a position upstream of the filter 90 and downstream of the oxygen sensor 84, in the exhaust passage 70. The pressure sensor 92 detects the pressure (which will also be called "upstream-side pressure") p1 at the position upstream of the filter 90. Also, a pressure sensor 94 is provided at a position downstream of the filter 90 in the exhaust passage 70. The pressure sensor 94 detects the pressure (which will also be called "downstream-side pressure") p2 at the position downstream of the filter 90. Each of the sensors outputs the detection result to the ECU 300.

The ECU 300 includes a CPU (Central Processing Unit), a memory, and a buffer (all of which are not shown). The ECU 300 controls devices or equipment so that the vehicle 1 is brought into a desired state, based on signals transmitted from the respective sensors, and maps and programs stored in the memory.

The ECU 300 determines whether the filter 90 needs to be regenerated, based on the detection results of the pressure sensors 92, 94. Also, the ECU 300 performs regeneration control on the filter 90 (which will also be called "GPF regeneration control").

The GPF regeneration control means control for raising the temperature of the filter 90 to a level that is equal to or higher than a regeneration permitting temperature (e.g., 500° C.-600° C.) at which regeneration of the filter 90 is permitted. When the temperature of the filter 90 rises to the regeneration permitting temperature, the PM deposited on the filter 90 is oxidized through combustion reaction with nitrogen dioxide ($NO_2$), or the like. In this manner, the PM can be removed from the filter 90.

As the GPF regeneration control, output level elevation control, ignition timing retard control, motoring control, or heating control may be used. These controls may be combined as appropriate. In the following, each control will be described one by one.

The output level elevation control is control for increasing the output from the engine 100 when the filter 90 needs to be regenerated. The output power generated by the engine 100 when the filter 90 needs to be regenerated is set to a value that is larger by a given amount ΔP than the output power (normal value) generated when the filter 90 need not be regenerated. More specifically, the output level elevation control is implemented by adjusting at least one of the throttle opening, fuel injection amount, and the ignition timing. When the output power from the engine 100 is increased, the temperature of exhaust gas emitted from the engine 100 is elevated. In this manner, the temperature of the filter 90 can be raised to the regeneration permitting temperature, so that the PM deposited on the filter 90 can be removed.

When the output level elevation control is performed, the first MG 10 is driven, using a part or the whole of the given amount ΔP of the output power. Therefore, the battery 150 is charged with electric power generated by the first MG 10.

The ignition timing retard control is control for retarding the ignition timing of the engine 100 when the filter 90 needs to be regenerated. The ignition timing at the time when the filter 90 needs to be regenerated is set so as to be retarded by a given amount ΔD, relative to the ignition timing (normal value) at the time when the filter 90 need not be regenerated. When the ignition timing is retarded, the temperature of exhaust gas emitted from the engine 100 is elevated, as is the case with the output level elevation control. In this manner, the PM deposited on the filter 90 can be removed.

When the ignition timing retard control is performed, the output power from the engine 100 is reduced. The reduction in the output power is compensated for by an increase of power generated from the second MG 20, for example; therefore, electric power is discharged from the battery 150.

The motoring control is control for rotating the crankshaft (not shown) of the engine 100 in a condition where combustion is stopped, using torque of the first MG 10. With the engine 100 thus rotated, air is drawn into the engine 100.

Oxygen in the air is supplied to the filter 90 without being burned in the engine 100. Therefore, a burning condition in the filter 90 is improved, so that removal of the deposited PM can be promoted. The engine speed Ne during motoring control is set to a rotational speed at which a sufficient amount of oxygen for raising the temperature of the filter 90 can be supplied to the filter 90, while the engine speed Ne is not so high as to cool the filter 90.

Under the motoring control, electric power is discharged from the battery 150 since the first MG 10 is driven using electric power of the battery 150.

The heating control is control for removing the PM by heating the filter 90 using an electric heater 91 provided for the filter 90. Current is applied to the electric heater 91 according to a control signal S4 from the ECU 300. Thus, the temperature of the filter 90 is raised to the regeneration permitting temperature, so that the PM deposited on the filter 90 can be burned and removed. As described above, electric power of the electric heater 91 is supplied from the battery 150.

The internal resistance of the battery has a tendency of increasing as the battery temperature decreases. Therefore, joule loss due to the internal resistance increases when the battery is in a low-temperature condition; therefore, the charging/discharging efficiency is reduced as compared with the time when the battery is in a relatively high-temperature condition. On the other hand, when the battery is in a high-temperature condition, the battery generates heat while being charged or discharging power; therefore, the battery temperature can be further elevated. Accordingly, it is necessary to restrict the charge/discharge power according to the battery temperature, so as to reduce an influence of reduction of the charging/discharging efficiency when the battery is in a low-temperature condition, or prevent a failure of the battery when the battery is in a high-temperature condition.

In the vehicle 1, the charge power upper limit value Win and the discharge power upper limit value Wout are set with respect to the battery 150. The charge power upper limit value Win indicates an upper limit value of the charge power with which the battery 150 is permitted to be charged. The discharge power upper limit value Wout indicates an upper limit value of the discharge power that is permitted to be discharged from the battery 150.

Figure 2:
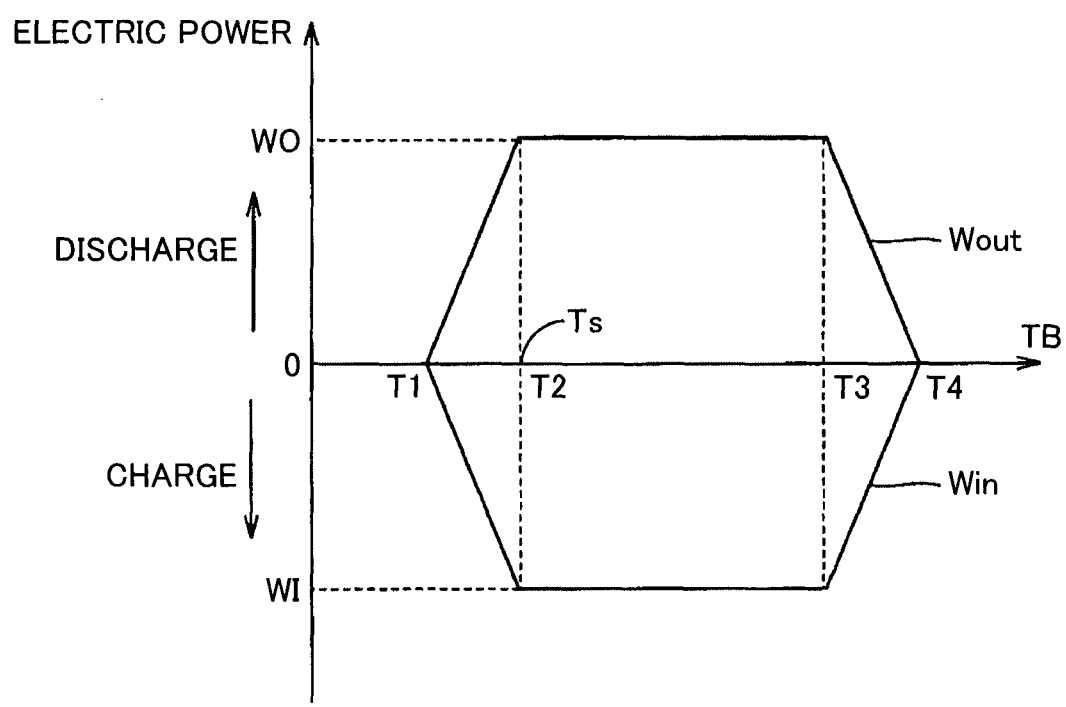
FIG. 2 is a view showing one example of temperature-dependent properties of a charge power upper limit value Win and a discharge power upper limit value Wout.

FIG. 2 is a view indicating one example of temperature-dependent properties of the charge power upper limit value Win and the discharge power upper limit value Wout. Referring to FIG. 2, the horizontal axis represents the battery temperature TB, and the vertical axis represents the charge/discharge power. The discharge power increases in a positive direction, and the charge power increases in a negative direction. In the following description, when the charge power supplied to the battery increases in the negative direction, it will be simply stated that the charge power increases, for the sake of easy understanding. Since the temperature dependence of the discharge power upper limit value Wout is similar to the temperature dependence of the charge power upper limit value Win, the charge power upper limit value Win will be explained as a typical example in the following.

When the battery temperature TB is lower than a temperature T1, the charge power upper limit value Win is equal to 0. Namely, charging is inhibited when the battery temperature TB is lower than the temperature T1. As a result, the GPF regeneration control cannot be performed.

When the battery temperature TB is equal to or higher than the temperature T1 and is lower than a temperature T2, the charge power upper limit value Win monotonically increases as the battery temperature TB increases, and reaches the maximum value WI at the temperature T2. Namely, when the battery temperature TB is equal to or higher than the temperature T1 and is lower than the temperature T2, the charge power is restricted, as compared with the time when the battery temperature TB is equal to or higher than the temperature T2 and is lower than a temperature T3. As a result, the GPF regeneration control is restricted.

More specifically described, when electric power generated by the first MG 10 exceeds the charge power upper limit value Win when the GPF regeneration control is performed in the vehicle 1, the battery 150 cannot be charged with the excess of the power. When electric power that should be supplied to the first MG 10, second MG 20, or the electric heater 91 exceeds the discharge power upper limit value Wout, the excess of the power cannot be supplied from the battery 150. Accordingly, when the battery 150 is in a low-temperature condition (when the battery temperature TB is equal to or higher than the temperature T1 and lower than the temperature T2), the GPF regeneration control may not be sufficiently carried out.

Thus, according to this embodiment, when the battery temperature TB is lower than a reference value Ts and when the filter 90 needs to be regenerated, warm-up control (which will also be called "battery warm-up control") for warming up the battery 150 is executed in advance of the GPF regeneration control. The reference value Ts is a value indicative of the battery temperature TB that makes it possible to secure charge power or discharge power needed for execution of the GPF regeneration control. In the first embodiment, the reference value Ts is set to the temperature T2. Since the charge power upper limit value Win increases through the battery warm-up control, it is possible to avoid a situation where the GPF regeneration control cannot be carried out because electric power generated by the first MG 10 is restricted due to restrictions on the charge power upper limit value Win. Similarly, since the discharge power upper limit value Wout increases through the battery warm-up control, it is possible to avoid a situation where the GPF regeneration control cannot be carried out because sufficient electric power cannot be discharged from the battery 150 due to restrictions on the discharge power upper limit value Wout. Thus, in this embodiment, when the battery 150 is in a low-temperature condition, the battery warm-up control is used for reducing restrictions on the charge/discharge power of the battery 150, so that the GPF regeneration control can be surely carried out.

Figure 3:
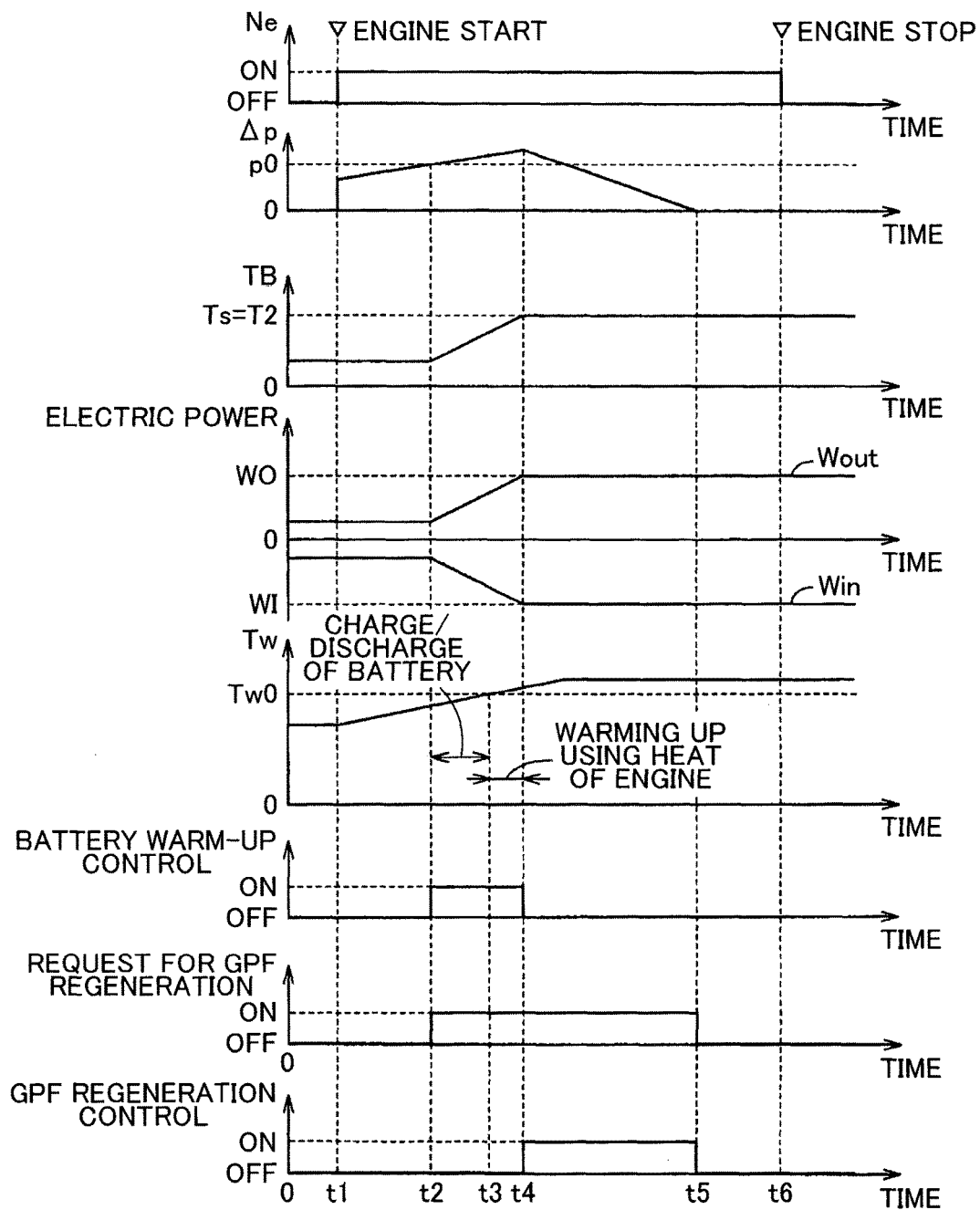
FIG. 3 is a timing chart useful for explaining battery warm-up control in the first embodiment.

FIG. 3 is a timing chart useful for explaining the battery warm-up control according to the first embodiment. Referring to FIG. 3, the horizontal axis indicates time, and the vertical axis indicates, as viewed from the top stage, the engine speed Ne, pressure difference $\Delta p$ (=p1−p2) between the upstream-side pressure p1 and the downstream-side pressure p2, battery temperature TB, charge/discharge power (discharge power upper limit value Wout and charge power upper limit value Win), engine temperature Tw, execution status of the battery warm-up control, presence or absence of a request for GPF regeneration, and execution status of the GPF regeneration control.

The engine 100 is in a stopped state until time t1 is reached. At this time, since the battery temperature TB is lower than the temperature T2, the discharge power upper limit value Wout is smaller than the maximum value WO, and the charge power upper limit value Win is smaller than the maximum value WI. Also, the engine temperature Tw is lower than a criterial value Tw0. At this time, neither the battery warm-up control nor the GPF regeneration control is carried out.

At time t1, the engine 100 is started. Then, exhaust gas is discharged from the engine 100, and PM (particulate matter) starts being deposited on the filter 90. As a result, a pressure difference Δp between the upstream-side pressure p1 and the downstream-side pressure p2 appears, and the pressure difference Δp increases with time. After time t1, the engine temperature Tw gradually increases as the engine 100 is driven.

At time t2, the pressure difference Δp exceeds a threshold value p0. This indicates that the amount of PM deposited on the filter 90 exceeds a specific amount; therefore, it is determined that regeneration control needs to be performed on the filter 90. The threshold value p0 may be a fixed value that is empirically determined or determined by design, or may be a variable value that is determined according to operating conditions of the engine 100. Also, the threshold value p0 may be set to a smaller value than a pressure difference for which regeneration of the filter 90 is actually needed. Namely, the threshold value p0 may be set to a value at which regeneration of the filter 90 is expected to be needed in the near future.

Since the battery temperature TB is lower than the temperature T2 at time t2, the charge/discharge power of the battery 150 is restricted. Thus, the GPF regeneration control may not be sufficiently performed; therefore, the battery warm-up control needs to be executed.

At time t2, the engine temperature Tw is lower than the criterial value Tw0. This indicates that the engine 100 is not sufficiently warmed up. Therefore, the battery warm-up control using heat of the engine 100 cannot be performed. Accordingly, the charge/discharge control of the battery 150 is performed as the battery warm-up control. Thus, the battery temperature TB increases due to heat generated through charge/discharge of the battery 150.

At time t3, the engine temperature Tw exceeds the criterial value Tw0. This indicates that the engine 100 is sufficiently warmed up; therefore, the method of the battery warm-up control is changed. Namely, in place of or in addition to charge/discharge of the battery 150, the fan 156 is driven so that air warmed by heat of the engine 100 flows through the duct 154. In this manner, hot air is led to the battery 150, so that the battery temperature TB can be increased even after time t3.

At time t4, the battery temperature TB exceeds the temperature T2. Therefore, the discharge power upper limit value Wout becomes equal to the maximum value W0, and the charge power upper limit value Win becomes equal to the maximum value WI. Accordingly, the battery warm-up control is finished, and the GPF regeneration control is started. Through the GPF regeneration control, the PM deposited on the filter 90 is burned. As a result, after time t4, the pressure difference Δp is gradually reduced.

When burning of the PM is completed at time t5, the pressure difference Δp is reduced down to a given value (in the example of FIG. 3, the pressure difference Δp becomes substantially equal to 0). This indicates that most of the PM deposited on the filter 90 is removed, and the filter 90 is brought back into a condition before deposition of the PM. Therefore, the GPF regeneration control is finished. Thereafter, at time t6, the engine 100 is stopped.

It is thus possible to increase the discharge power upper limit value Wout and the charge power upper limit value Win, by executing the battery warm-up control; therefore, the GPF regeneration control can be surely performed. When the engine temperature Tw is equal to or higher than the criterial value Tw0, the battery temperature TB can be raised using heat of the engine 100. Thus, electric power from the battery 150 can be saved. On the other hand, even when the engine temperature Tw is lower than the criterial value Tw0, the battery temperature TB can be raised using heat generated through charge/discharge of the battery 150.

When the ECU 300 performs the battery warm-up control under which the battery 150 is charged, it is preferable to control the engine 100 and the PCU 250 so as to increase the charge power as much as possible within a range that does not exceed the charge power upper limit value Win. Similarly, when the ECU 300 performs the battery warm-up control under which electric power is discharged from the battery 150, it is preferable to control the engine 100, PCU 250, etc., so as to increase the discharge power as much as possible within a range that does not exceed the discharge power upper limit value Wout. In this manner, the quantity of heat generated by the battery 150 is increased, so that the battery temperature TB can be raised early.

In addition, as the battery warm-up control performed when the engine temperature Tw is lower than the criterial value Tw0, the battery 150 may be warmed using an electric heater (not shown) provided outside the battery 150, for example. The heat generated from the electric heater may be used in combination with the heat generated by the battery 150 itself, or may be used alone, so as to raise the battery temperature TB.

Figure 4:
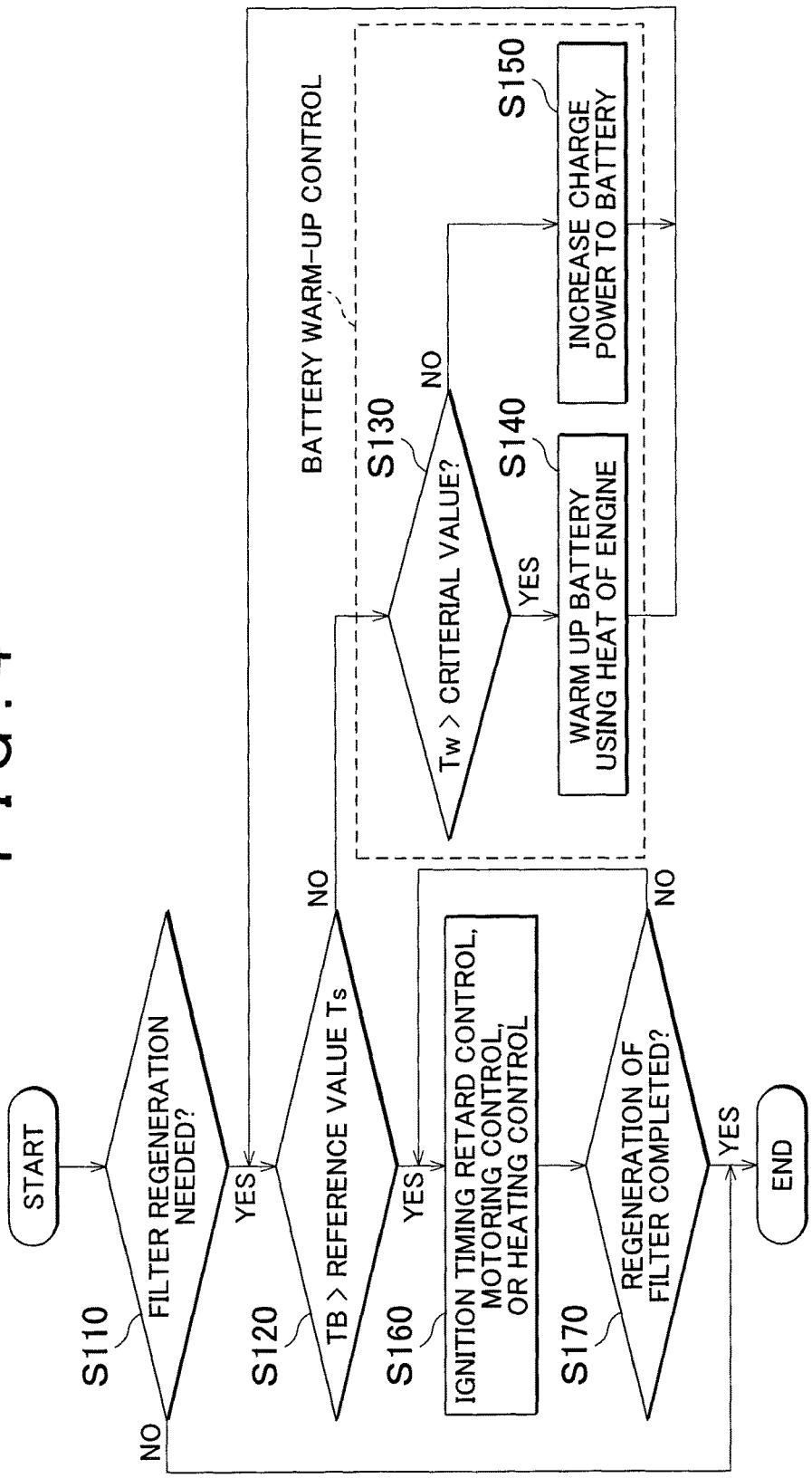
FIG. 4 is a flowchart illustrating a control routine executed when control under which electric power is discharged from a battery is performed as GPF regeneration control in the first embodiment.
Figure 5:
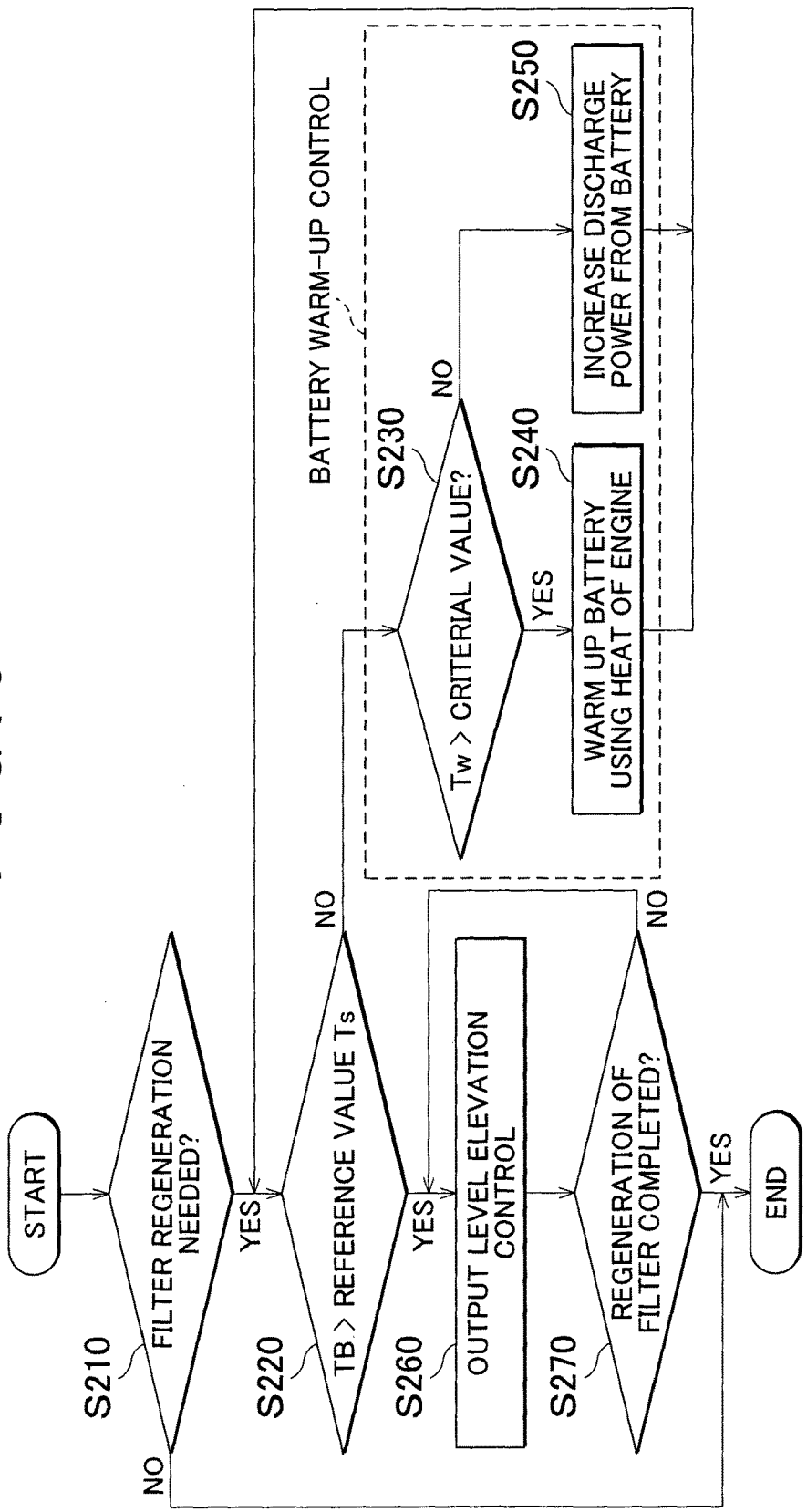
FIG. 5 is a flowchart illustrating a control routine executed when control under which the battery is charged is performed as GPF regeneration control in the first embodiment.

Next, the GPF regeneration control having the battery warm-up control executed by the ECU 300 in this embodiment will be described, using the flowcharts shown in FIG. 4 and FIG. 5. Referring to FIG. 4, the GPF regeneration control under which electric power is discharged from the battery 150 (namely, the ignition timing retard control, motoring control or heating control) will be described. Referring to FIG. 5, the GPF regeneration control under which the battery 150 is charged (namely, the output level elevation control) will be described.

FIG. 4 is a flowchart illustrating a control routine executed when control under which electric power is discharged from the battery 150 is performed as the GPF regeneration control in the first embodiment. The control routine of FIG. 4 is executed when a certain condition is satisfied or each time a given period of time elapses. While each step of the flowchart of FIG. 4 is basically implemented through software processing by the ECU 300, it may be implemented by hardware processing using an electronic circuit fabricated in the ECU 300.

In step S110, the ECU 300 determines whether the filter 90 needs to be regenerated, based on the pressure difference Δp between the upstream-side pressure p1 and the downstream-side pressure p2. When the filter 90 needs to be regenerated (YES in step S110, see time t2 of FIG. 3), the control proceeds to step S120.

In step S120, the ECU 300 determines whether the battery temperature TB is higher than the reference value Ts (=temperature T2). When the battery temperature TB is equal to or lower than the reference value Ts (NO in step S120, see time t2 of FIG. 3), the battery 150 needs to be warmed up, and therefore, the control proceeds to step S130.

In step S130, the ECU 300 determines whether the engine temperature Tw is higher than the criterial value Tw0. When the engine temperature Tw is equal to or lower than the criterial value Tw0 (NO in step S130, see time t2 of FIG. 3), the engine 100 is not sufficiently warmed up, and therefore, the control proceeds to step S150. In step S150, the ECU 300 increases the charge power with which the battery 150 is charged. It is thus possible to warm up the battery 150, and also secure the SOC of the battery 150, in preparation for discharge of the battery 150 under the GPF regeneration control (step S160) which will be described later.

When the engine temperature Tw is higher than the criterial value Tw0 in step S130 (YES in step S130, see time t3 of FIG. 3), the engine 100 is sufficiently warmed up; therefore, the control proceeds to step S140. In step S140, the ECU 300 drives the fan 156 so that air warmed by the engine 100 is led to the battery 150. When the battery warm-up control (step S140 or step S150) is completed, the control returns to step S120.

When the battery temperature TB is higher than the reference value Ts in step S120 (YES in step S120, see time t4 of FIG. 3), warm-up of the battery 150 is completed (or the battery 150 need not be warmed up from the beginning); therefore, the control proceeds to step S160. In step S160, the ECU 300 executes at least one of the ignition timing retard control, motoring control, and heating control, as the GPF regeneration control. Thus, the temperature of the filter 90 is raised.

Then, in step S170, the ECU 300 determines whether the GPF regeneration control is completed, based on the pressure difference Δp. When the pressure difference Δp is equal to or larger than a threshold value, for example, the ECU 300 determines that the GPF regeneration control is not completed. In this case (NO in step S170), the control returns to step S160, and the GPF regeneration control is continued. On the other hand, when the pressure difference Δp is smaller than the threshold value (when the pressure difference is almost equal to 0 in FIG. 3), it is determined that the GPF regeneration control is completed. In this case (YES in step S170, see time t5 of FIG. 3), one cycle of the control routine shown in FIG. 4 ends. When the filter 90 need not be regenerated in step S110 (NO in step S110), too, one cycle of the routine ends.

With the control according to the routine as described above, when the control under which electric power is discharged from the battery 150 is performed as the GPF regeneration control, the discharge power upper limit value Wout of the battery 150 is increased through the battery warm-up control. Thus, it is possible to avoid a situation where the GPF regeneration control cannot be performed because sufficient electric power cannot be discharged from the battery 150 due to restrictions on the discharge power upper limit value Wout.

FIG. 5 is a flowchart illustrating a control routine executed when the control under which the battery 150 is charged is performed as the GPF regeneration control in the first embodiment. Steps S210, S220, S230, S240 in FIG. 5 are equivalent to steps S110, S120, S130, S140 in FIG. 4, respectively; therefore, detailed description of these steps will not be repeated.

In step S250, the ECU 300 increases electric power discharged from the battery 150. As a result, the battery 150 is warmed up, and some room for the SOC of the battery 150 can be secured, in preparation for charging of the battery 150 under the GPF regeneration control (step S260) that will be described later. When the battery warm-up control (step S240 or step S250) ends, the control returns to step S220.

When the battery temperature TB is higher than the reference value Ts in step S220 (YES in step S220, see time t4 of FIG. 3), warm-up of the battery 150 is completed, and therefore, the control proceeds to step S260. In step S260, the ECU 300 performs the output level elevation control as the GPF regeneration control. As a result, the temperature of the filter 90 rises. The following step S270 is equivalent to step S170 of FIG. 4, and therefore, will not be repeatedly described in detail.

With the control according to the control routine as described above, when the control under which the battery 150 is charged is performed as the GPF regeneration control, the charge power upper limit value Win of the battery 150 is increased through the battery warm-up control. Thus, it is possible to avoid a situation where the GPF regeneration control cannot be carried out because electric power generated by the first MG 10 is restricted due to restrictions on the charge power upper limit value Win, and the output of the engine 100 cannot be sufficiently increased.

The ECU 300 may execute only one of the control routines shown in the flowcharts of FIG. 4 and FIG. 5, or may execute both of the control routines by suitably combining them. For example, when the temperature of the filter 90 is lower than a given temperature, it is preferable to execute the motoring control (see step S160 of FIG. 4) after executing the output level elevation control (see step S260 of FIG. 5). The temperature of the filter 90 needs to be reasonably high so that the PM is favorably burned, using oxygen supplied to the filter 90 through the motoring control. The temperature of the filter 90 is raised by exhaust gas when the output level elevation control is performed; therefore, the effect of oxygen supply through the motoring control can be enhanced. When the temperature of the filter 90 is higher than the above-mentioned given temperature, the output level elevation control may be omitted, and only the motoring control may be executed.

In the first embodiment, the reference value Ts is equal to the temperature T2 at which each of the charge power upper limit value Win and the discharge power upper limit value Wout reaches the maximum value. However, the reference value Ts may be different from the temperature T2. In the second embodiment, the battery is warmed up until the battery temperature reaches a reference value Ts that is higher than the temperature T2. The configuration of a vehicle according to the second embodiment is substantially identical with that of the vehicle 1 shown in FIG. 1, and therefore, will not be repeatedly explained.

Figure 6:
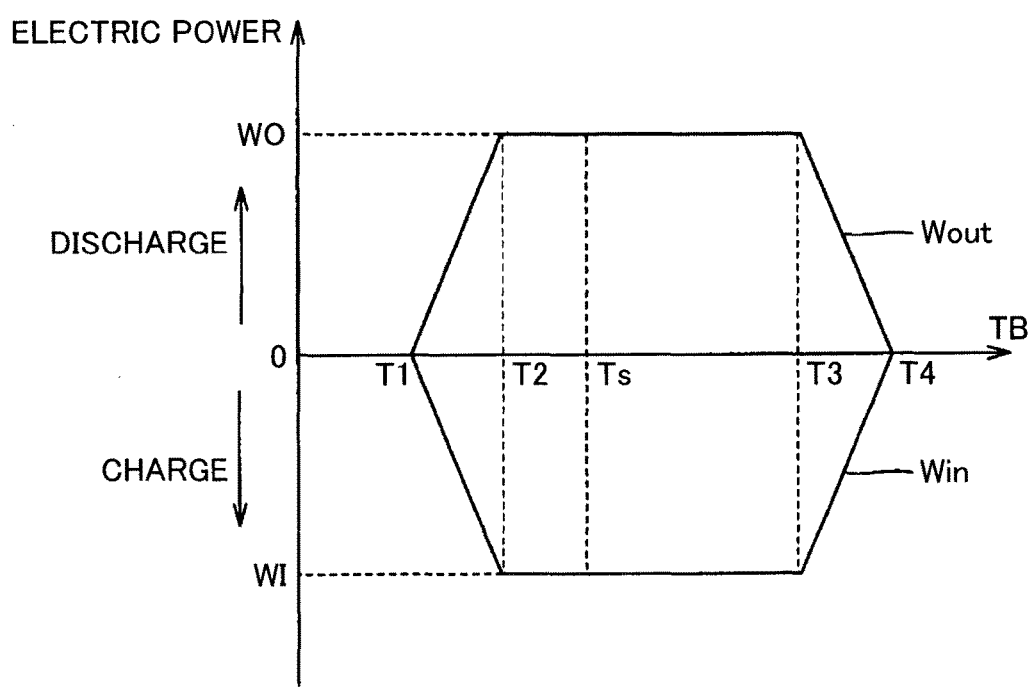
FIG. 6 is a view useful for explaining setting of a reference value Ts in a second embodiment of the invention.

FIG. 6 is a view useful for explaining setting of the reference value Ts in the second embodiment. Referring to FIG. 6, the reference value Ts used in the second embodiment is different from the reference value Ts shown in FIG. 2 in that the reference value Ts of the second embodiment is set to be higher than the temperature T2.

Figure 7:
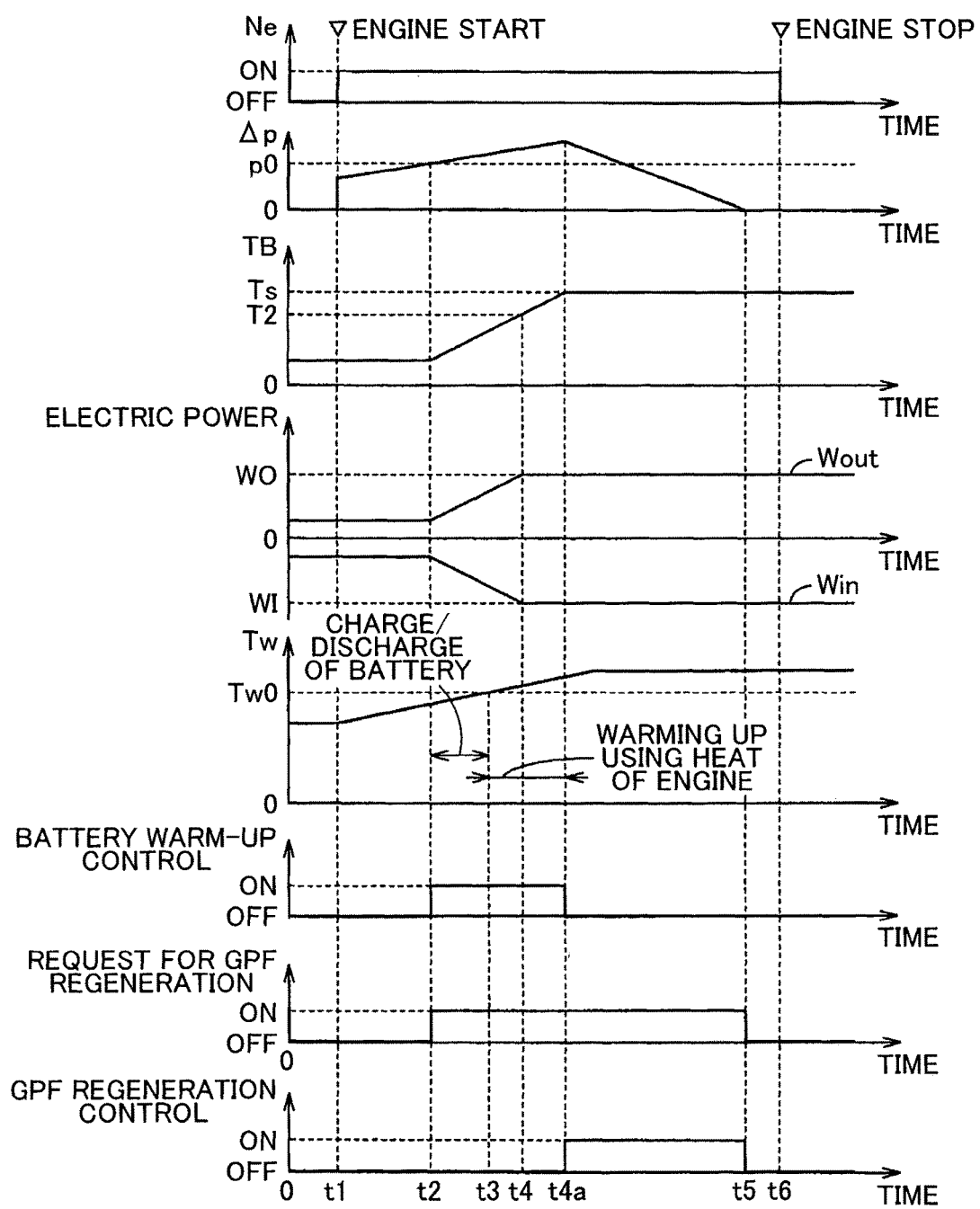
FIG. 7 is a timing chart useful for explaining battery warm-up control in the second embodiment.

FIG. 7 is a timing chart useful for explaining battery warm-up control in the second embodiment. Referring to FIG. 7, control before time t3 is substantially the same as control before time t3 in the timing chart shown in FIG. 3, and therefore, will not be repeatedly described in detail. At time t4, the battery temperature TB exceeds the temperature T2. Therefore, the discharge power upper limit value Wout becomes equal to the maximum value W0, and the charge power upper limit value Wout becomes equal to the maximum value WI. However, since the reference value Ts is set to be higher than the temperature T2 in the second embodiment, as described above, the battery warm-up control is continued.

At time t4a, the battery temperature TB exceeds the reference value Ts. Therefore, the battery warm-up control is finished, and the GPF regeneration control is executed. Through the GPF regeneration control, the PM deposited on the filter 90 is burned. As a result, after time t4a, the pressure difference Δp is gradually reduced. Control after time t5 is substantially the same as control after time t5 in the timing chart shown in FIG. 3, and therefore, will not be repeatedly described.

The control routine executed when the ignition timing retard control, motoring control or heating control is performed as the GPF regeneration control in the second embodiment is substantially the same as that illustrated in the flowchart of FIG. 4. Also, the control routine executed when the output level elevation control is performed as the GPF regeneration control in the second embodiment is substantially the same as that illustrated in the flowchart of FIG. 5. Accordingly, detailed description regarding the control routines will not be repeated in the second embodiment.

Thus, according to the second embodiment, when the reference value Ts is set to a value different from the temperature T2, too, the battery can be warmed up until the GPF regeneration control becomes able to be carried out. Since a margin for the temperature T2 can be secured by warming up the battery to a temperature level higher than the temperature T2, the charge power or discharge power is less likely to be restricted even when the battery temperature TB is lowered during execution of the GPF regeneration control.

The temperature T2 is specified so as to protect the battery by restricting the charge power and the discharge power, and is a fixed value that is determined according to the specifications of the battery. On the other hand, the reference value Ts is specified so as to secure the charge power or discharge power needed for execution of the GPF regeneration control. Therefore, the reference value Ts can be changed according to a method of executing the GPF regeneration control (which (one) of the ignition timing retard control, motoring control, heating control and the output level elevation control is executed (performed)), for example. In the third embodiment, the reference value Ts is a variable value. The configuration of the (a) vehicle according to the third embodiment is equivalent to (substantially the same as) the configuration of the vehicle 1 shown in FIG. 1, and therefore, will not be repeatedly described.

Figure 8:
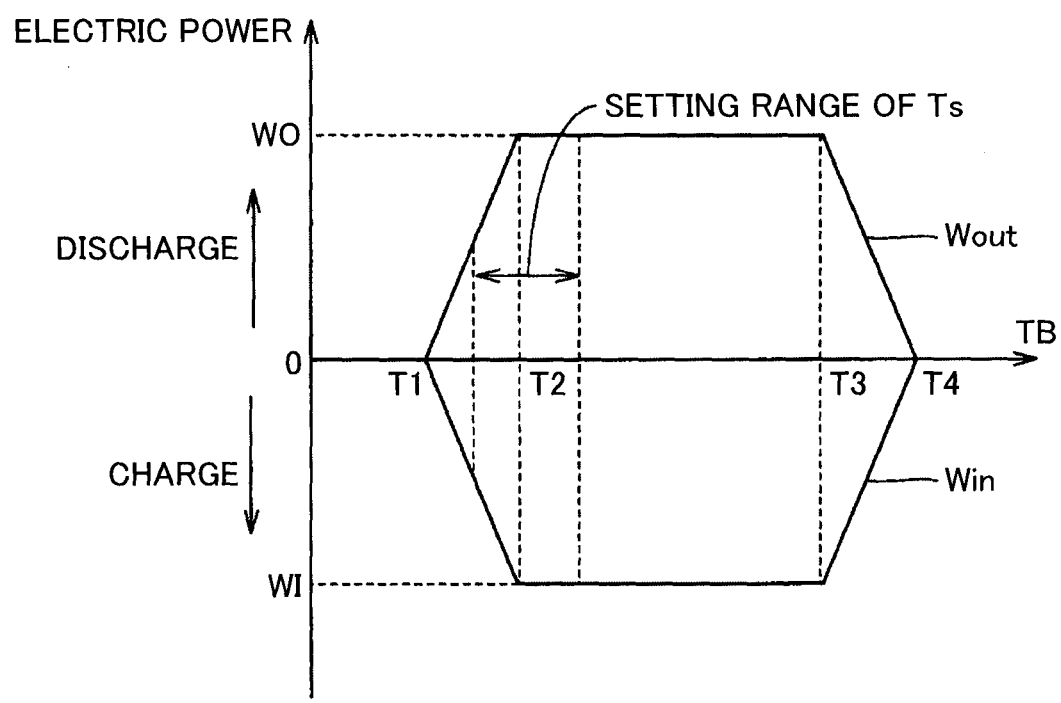
FIG. 8 is a view useful for explaining setting of a reference value Ts in a third embodiment of the invention.

FIG. 8 is a view useful for explaining setting of the reference value Ts in the third embodiment. Referring to FIG. 8, the reference value Ts used in the third embodiment is set within a given range including the temperature T2.

Figure 9:
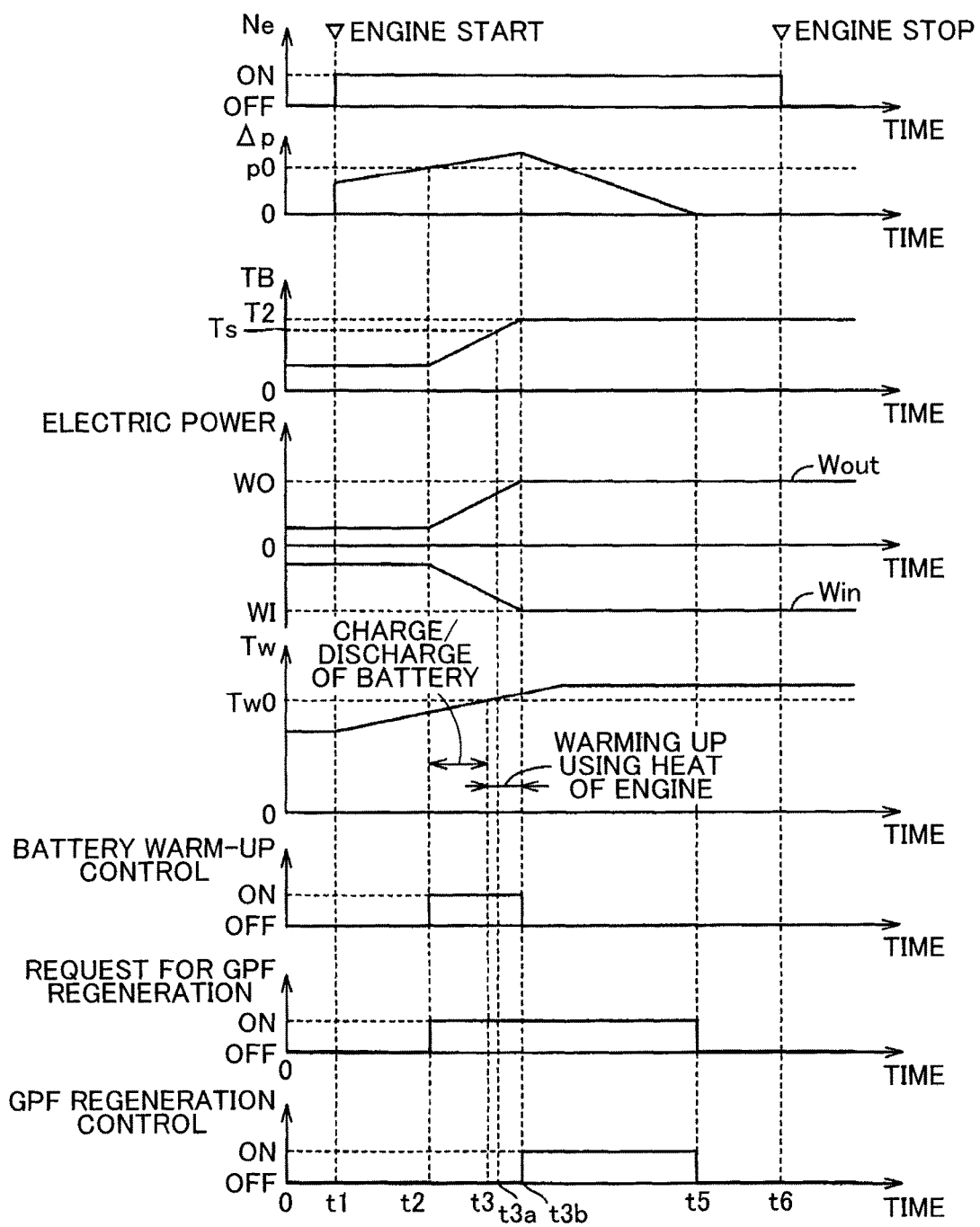
FIG. 9 is a timing chart useful for explaining battery warm-up control in the third embodiment.

FIG. 9 is a timing chart useful for explaining the battery warm-up control according to the third embodiment. While the reference value Ts may be larger than the temperature T2 or smaller than the temperature T2, depending on the manner of setting the reference value Ts, the case where the reference value Ts is set to be smaller than the temperature T2 will be described in FIG. 9. Referring to FIG. 9, control before time t3 is substantially the same as control before time t3 in the timing chart shown in FIG. 3, and therefore, will not be repeatedly described.

At time t3a, the battery temperature TB exceeds the reference value Ts. This indicates that the battery 150 is warmed up to a battery temperature TB at which the GPF regeneration control can be performed. However, since the battery temperature TB is lower than the temperature T2, the charge power and discharge power of the battery 150 are restricted. Therefore, in this embodiment, the battery warm-up control is continued so that the GPF regeneration control can be surely or reliably performed.

At time t3b, the battery temperature TB exceeds the temperature T2. Therefore, the discharge power upper limit value Wout becomes equal to the maximum value WO, and the charge power upper limit value Win becomes equal to the maximum value WI. Thus, the battery warm-up control is finished, and the GPF regeneration control is executed.

Through the GPF regeneration control, the PM deposited on the filter 90 is burned. As a result, after time t3b, the pressure difference Δp is gradually reduced. The control after time t5 is substantially the same as the control after time t5 in the timing chart shown in FIG. 3, and therefore, will not be repeatedly explained.

FIG. 10 is a flowchart illustrating a control routine executed when control under which electric power is discharged from the battery 150 is performed as the GPF regeneration control in the third embodiment. Referring to FIG. 10, step S310 is equivalent to step S110 shown in FIG. 4, and therefore, will not be repeatedly described.

In step S315, the ECU 300 sets a reference value Ts. The reference value Ts may be set depending on which control of the ignition timing retard control, motoring control and the heating control will be performed in step S360 that will be described later.

In step S320, the ECU 300 determines whether the battery temperature TB exceeds the higher one of the reference value Ts and the temperature T2. When the battery temperature TB exceeds the higher one of the reference value Ts and the temperature T2 (YES in step S320, see time t3b of FIG. 9), the ECU 300 executes at least one of the ignition timing retard control, motoring control and the heating control as the GPF regeneration control (step S360). The following step S370 is equivalent to step S170 shown in FIG. 4, and therefore, will not be repeatedly described.

On the other hand, when the battery temperature TB is equal to or lower than the higher one of the reference value Ts and the temperature T2 (NO in step S320), the ECU 300 performs the battery warm-up control (step S330, S340, S350). The battery warm-up control is substantially the same as the operations of steps S130, S140, S150 shown in FIG. 4, and therefore, will not be repeatedly described in detail.

When the output level elevation control is performed as the GPF regeneration control, the operation of step S260 (see FIG. 5) is applied in place of step S360, so that the control routine becomes substantially identical with that of the flowchart shown in FIG. 10. Thus, the control routine in this case will not be repeatedly described in detail.

According to the third embodiment, even when the reference value Ts is variably set according to the method of performing the GPF regeneration control, for example, the battery can be warmed up and brought into a condition where the GPF regeneration control can be performed.

When the reference value Ts is set to be lower than the temperature T2, the battery may be warmed up until the battery temperature TB exceeds the reference value Ts, or the battery may be warmed up until the battery temperature TB exceeds the temperature T2 as in this embodiment. According to this embodiment, the battery warm-up control is performed until the battery temperature TB reaches the relatively high temperature T2, so that the GPF regeneration control can be surely or reliably continued until the battery temperature TB is lowered to the reference value Ts even after the battery warm-up control is finished.

In the first through third embodiments, the temperature T2 corresponds to "threshold value". However, the "threshold value" may be any temperature provided that it is higher than the temperature T1 and is equal to or lower than the temperature T2 in the examples shown in FIG. 2, FIG. 6 and FIG. 8.

In the illustrated embodiments, it is determined whether the filter 90 needs to be regenerated, using the pressure difference Δp between the upstream-side pressure p1 and the downstream-side pressure p2. However, the method of determining whether the filter 90 needs to be regenerated is not limited to this method. For example, the ECU 300 may estimate the amount of deposition of the PM, using various sensors, such as the air-fuel ratio sensor 82, oxygen sensor 84, air flow meter (not shown), throttle opening sensor (not shown), and the water temperature sensor 104. The ECU 300 may also estimate the amount of deposition of the PM, based on the operation history (such as operating time) of the engine 100, or the amount of reduction of the output of the engine 100, for example.

In the illustrated embodiments, the fan 156 is provided in the duct 154. However, a mechanism for leading air warmed by the engine 100 to the battery 150 is not particularly limited. For example, a valve that is opened and closed according to control of the ECU 300 may be provided in the duct 154. Also, the form and location of the duct 154 are not particularly limited. For example, the duct 154 may lead the air warmed by the engine 100 to the vehicle interior, and lead the air in the vehicle interior to the battery 150.

While the GPF is installed in the exhaust passage of the gasoline engine in the first through third embodiments, the type of the filter is selected as appropriate according to the type of the fuel of the engine. For example, a DPF (Diesel Particulate Filter) is installed in an exhaust passage of a diesel engine.

Finally, referring again to FIG. 1, the embodiments of the invention will be summed up. The vehicle 1 includes the engine 100, the filter 90 for trapping the PM in the exhaust gas of the engine 100, the battery 150, the first MG 10 capable of charging the battery 150 by generating electric power using power of the engine 100, and also capable of driving the engine 100 using electric power of the battery 150, and the ECU 300 that controls the engine 100 and the first MG 10. When the GPF regeneration control for raising the temperature of the filter 90 to the regeneration permitting temperature and burning the PM needs to be performed, the ECU 300 controls the engine 100 and the first MG 10 so as to warm up the battery 150 when the battery temperature TB is lower than a predetermined reference value Ts.

Preferably, the ECU 300 performs the GPF regeneration control when the battery temperature TB exceeds the reference value Ts.

Preferably, the ECU 300 warms up the battery 150 using air warmed by the engine 100 when the temperature (engine temperature) Tw of the engine 100 exceeds a predetermined criterial value Tw0, and warms up the battery 150 through charge or discharge of the battery 150 when the engine temperature Tw is lower than the criterial value Tw0.

Preferably, when the battery temperature TB is lower than the temperature T2 (threshold value), the upper limit value of electric power discharged from the battery 150 (the discharge power upper limit value Wout) is set to be smaller than that when the battery temperature TB is higher than the temperature T2. When the battery temperature TB is lower than the temperature T2, the ECU 300 warms up the battery 150 until the battery temperature TB exceeds the temperature T2.

Preferably, when the GPF regeneration control is performed by increasing oxygen in the exhaust gas through motoring control under which the first MG 10 drives the engine 100 in a condition where no combustion takes place in the engine 100, the temperature T2 is set to a temperature at which electric power required for motoring can be supplied from the battery 150.

Preferably, when the battery temperature TB is lower than the temperature T2, the charge power upper limit value Win of electric power with which the battery 150 is charged is set to a smaller value than that set when the battery temperature TB is higher than the temperature T2 (threshold value). When the battery temperature TB is lower than the temperature T2, the battery 150 is warmed up until the battery temperature TB becomes higher than the temperature T2.

Preferably, when the GPF regeneration control is performed by increasing the output of the engine 100 and thus raising the temperature of exhaust gas, the temperature T2 is set to a temperature at which the battery 150 can be charged with electric power generated by the first MG 10 and corresponding to the amount of increase in the output of the engine 100.

Preferably, the reference value Ts is set to be larger than the temperature T2. When the battery temperature TB is lower than the reference value Ts, the ECU 300 warms up the battery 150 until the battery temperature TB becomes higher than the reference value Ts.

Preferably, when the battery temperature TB exceeds the higher one of the reference value Ts and the temperature T2, the ECU 300 performs the GPF regeneration control.

Referring again to FIG. 1, FIG. 4 and FIG. 5, the vehicle 1 includes the engine 100, the filter 90 for trapping the PM discharged from the engine 100, the battery 150, and the first MG 10 capable of charging the battery 150 by generating electric power using power of the engine 100 and also capable of driving the engine 100 using electric power of the battery 150. A method of controlling the vehicle 1 includes steps S140, S240 for warming up the battery 150 when the engine temperature Tw is higher than the predetermined criterial value Tw0 and when the GPF regeneration control for raising the temperature of the filter 90 to the regeneration permitting temperature so as to burn the PM needs to be performed, and steps S160, S260 for executing the GPF regeneration control, after steps S140, S240 for warming up the battery 150.

It should be appreciated that the embodiments disclosed herein are merely exemplary but not restrictive in all aspects. The scope of the invention is not defined by the above explanation but defined by the appended claims, and is intended to include all changes or modifications that fall within the range of the claims and equivalents thereof.

The invention claimed is:

1. A hybrid vehicle comprising:
   an internal combustion engine;
   a filter configured to trap particulate matter in exhaust gas of the internal combustion engine;
   an electrical storage device;
   a rotating electric machine configured to generate electric power using power from the internal combustion engine so as to charge the electrical storage device, and drive the internal combustion engine using electric power from the electrical storage device; and
   a controller configured to:
      control the internal combustion engine and the rotating electric machine so as to warm up the electrical storage device, when regeneration control needs to be performed and when a temperature of the electrical storage device is lower than a reference value, the regeneration control being control for raising a temperature of the filter to a predetermined temperature so as to burn the particulate matter, and
      execute the regeneration control when the temperature of the electrical storage device exceeds the reference value.

2. The hybrid vehicle according to claim 1, wherein the controller is configured to warm up the electrical storage device using air warmed by the internal combustion engine, when a temperature of the internal combustion engine is higher than a criterial value, and warm up the electrical storage device by charging or discharging the electrical storage device, when the temperature of the internal combustion engine is lower than the criterial value.

3. The hybrid vehicle according to claim 1, wherein:

an upper limit value of discharge power discharged from the electrical storage device when the temperature of the electrical storage device is lower than a first threshold value is set to be smaller than an upper limit value of discharge power discharged from the electrical storage device when the temperature of the electrical storage device is higher than the first threshold value; and the controller is configured to warm up the electrical storage device until the temperature of the electrical storage device becomes higher than the first threshold value, when the temperature of the electrical storage device is lower than the first threshold value.

4. The hybrid vehicle according to claim 3, wherein the first threshold value is set to a first predetermined temperature, the first predetermined temperature being a temperature at which electric power needed for motoring control performed on the internal combustion engine can be supplied from the electrical storage device, when the regeneration control is performed by increasing oxygen in the exhaust gas through the motoring control, the motoring control being control for causing the rotating electric machine to drive the internal combustion engine in a condition where no combustion takes place in the internal combustion engine.

5. The hybrid vehicle according to claim 1, wherein:

an upper limit value of charge power with which the electrical storage device is charged when the temperature of the electrical storage device is lower than a second threshold value is set to be smaller than an upper limit value of charge power with which the electrical storage device is charged when the temperature of the electrical storage device is higher than the second threshold value; and the controller is configured to warm up the electrical storage device until the temperature of the electrical storage device becomes higher than the second threshold value, when the temperature of the electrical storage device is lower than the second threshold value.

6. The hybrid vehicle according to claim 5, wherein the second threshold value is set to a second predetermined temperature, the second predetermined temperature is a temperature at which the electrical storage device can be charged with electric power generated by the rotating electric machine when the regeneration control is performed by raising a temperature of the exhaust gas by increasing an output of the internal combustion engine, and the electric power generated by the rotating electric machine corresponds to an amount of increase of the output from the internal combustion engine.

7. The hybrid vehicle according to claim 3, wherein:

the reference value is set to be larger than the first threshold value; and the controller is configured to warm up the electrical storage device until the temperature of the electrical storage device becomes higher than the reference value, when the temperature of the electrical storage device is lower than the reference value.

8. The hybrid vehicle according to claim 5, wherein:

the reference value is set to be larger than the second threshold value; and the controller is configured to warm up the electrical storage device until the temperature of the electrical storage device becomes higher than the reference value, when the temperature of the electrical storage device is lower than the reference value.

9. The hybrid vehicle according to claim 3, wherein the controller is configured to execute the regeneration control when the temperature of the electrical storage device exceeds a larger one of the reference value and the first threshold value.

10. The hybrid vehicle according to claim 5, wherein the controller is configured to execute the regeneration control when the temperature of the electrical storage device exceeds a larger one of the reference value and the second threshold value.

11. A method of controlling a hybrid vehicle, the hybrid vehicle including an internal combustion engine, a filter, an electrical storage device, a rotating electric machine, and a controller, the filter being configured to trap particulate matter in exhaust gas of the internal combustion engine, the rotating electric machine being configured to generate electric power using power from the internal combustion engine so as to charge the electrical storage device, and drive the internal combustion engine using electric power from the electrical storage device, the method comprising:

warming up the electrical storage device, by the controller, when regeneration control needs to be performed and when a temperature of the electrical storage device is lower than a reference value; and executing the regeneration control, by the controller, after the electrical storage device is warmed up and the temperature of the electrical storage device exceeds the reference value, the regeneration control being control for raising a temperature of the filter to a predetermined temperature so as to burn the particulate matter.

* * * * *